M. CARLSON.
BAND CUTTER AND FEEDER.
APPLICATION FILED AUG. 8, 1908.
922,668.
Patented May 25, 1909.
2 SHEETS—SHEET 1.
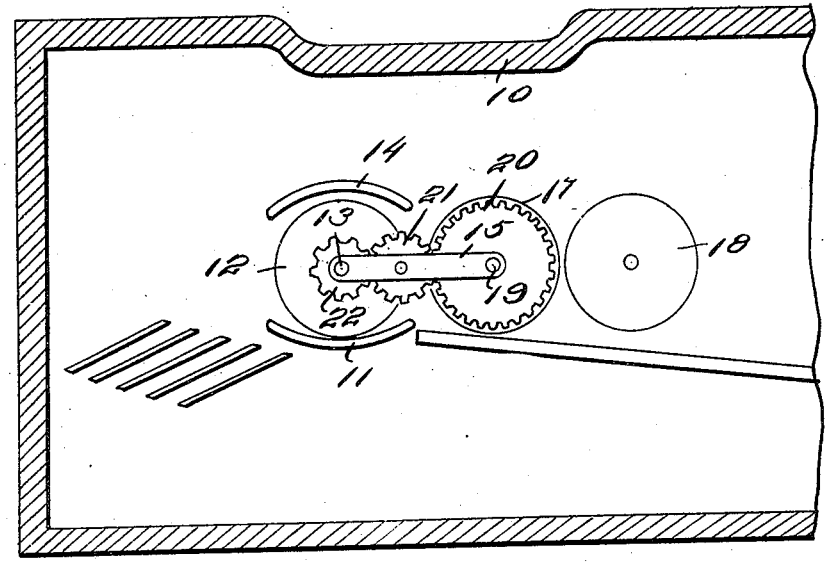

M. CARLSON.
BAND CUTTER AND FEEDER.
APPLICATION FILED AUG. 8, 1908.

922,668.

Patented May 25, 1909.
2 SHEETS—SHEET 2.

UNITED STATES PATENT OFFICE.

MARTIN CARLSON, OF DIAMOND BLUFF, WISCONSIN.

BAND-CUTTER AND FEEDER.

No. 922,668.   Specification of Letters Patent.   Patented May 25, 1909.

Application filed August 8, 1908. Serial No. 447,609.

*To all whom it may concern:*

Be it known that I, MARTIN CARLSON, a citizen of the United States, residing at Diamond Bluff, in the county of Pierce and State of Wisconsin, have invented certain new and useful Improvements in Band-Cutters and Feeders, of which the following is a specification.

This invention relates to threshing machines, having special reference to an attachment to be applied thereto.

An object of this invention is to provide a threshing machine with a spreading cylinder whereby the grain will be spread out evenly as it is fed from the band cutter into the concave beneath the thresher cylinder.

Another object of this invention is to provide a machine for cutting bundles which escape from the band cutter before they are fed to the thresher cylinder.

A further object of this invention is to provide a cylinder with a plurality of blades disposed at an angle to the axis of the same for the purpose of spreading the clusters of grain which are fed from the band cutter before the grain enters the thresher cylinder.

The invention has as a still further object the provision of a device of this character that can be raised out of operative position when desired so as to gain ready access to the thresher cylinder.

Other objects and advantages will be apparent from the following description and it will be understood that changes in the specific structure shown and described may be made within the scope of the claim without departing from the spirit of the invention.

Figure 3:
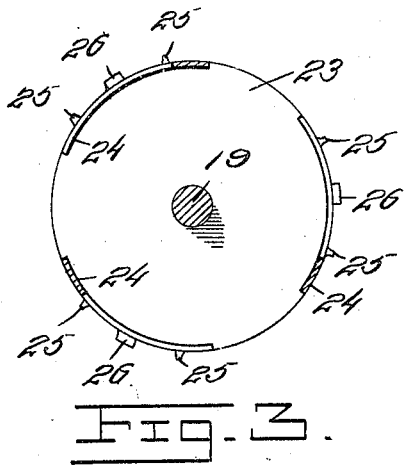
Figure 4:
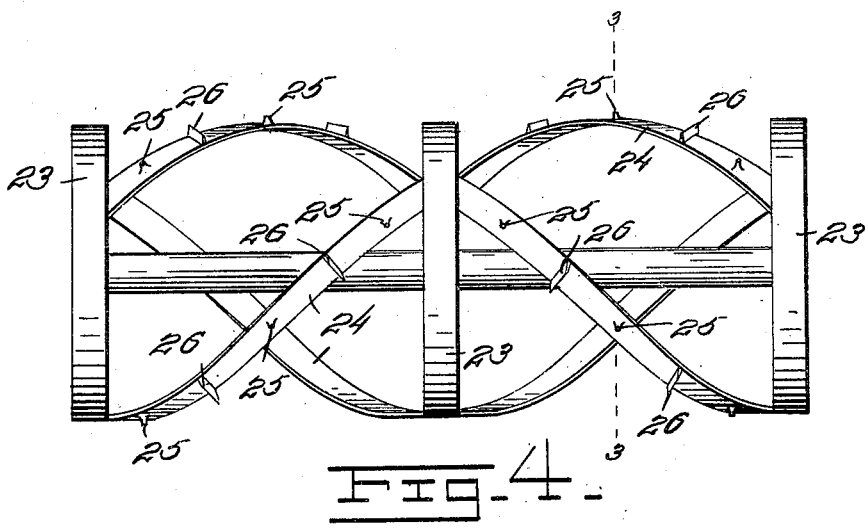

In the drawings forming a portion of the specification and in which like numerals of reference indicate similar parts in the several views, Figure 1 is a vertical longitudinal section of a cylinder of ordinary construction, having the device applied in operative position. Fig. 2 is a top plan view of the same having the casing removed. Fig. 3 is a vertical transverse section on the line 3—3 of Fig. 4. Fig. 4 is a detailed view of the spreading cylinder in side elevation.

Referring now to the drawings 10 designates the casing of a threshing machine which is of ordinary construction and which is provided upon its interior with a concave 11 which is positioned centrally thereof beneath a threshing cylinder 12. The threshing cylinder is of any adaptable construction and is mounted upon the shaft 13 transversely disposed within the casing 10. A cap 14 is mounted above the thresher cylinder in the casing 10.

The shaft 13 pivotally carries at its opposite extremity two arms 15 and 16 which extend in a parallel direction therefrom and support in their outer ends the spreading cylinder 17, the subject of this invention.

The casing 10 carries a band cutter 18 forward of the thresher cylinder 12 which receives the bundles of grain and cuts the bands securing them before they are fed into the cylinder 10.

The spreader cylinder 17 is located intermediately of the band cutter 18 and the thresher cylinder 12 for the purpose of intercepting the passage of and acting upon the grain as it is conveyed therebetween. The spreader cylinder 17 is mounted upon a shaft 19 which carries at its opposite ends gears 20 which mesh with idlers 21 intermediately disposed upon the arms 15 and 16, the idlers 21 meshing with the pinions 22 disposed upon the shaft 13 for the purpose of actuating the spreader 17. The spreader cylinder 17 comprises the shaft 19 which supports three equidistantly spaced heads 23 which carry a plurality of metallic strips 24 which are disposed spirally across the peripheries of the heads 23.

The strips 24 diverge in opposite directions from the center head 23 toward the end heads 23 for the purpose of giving an outwardly feeding action during the rotation of the same. The strips 24 are provided on their outer faces with longitudinal rows of teeth 25 and cutting blades 26 which are alternately disposed thereon. The teeth 25 are employed for the purpose of assisting and in insuring the proper spreading action of the grain and the cutting blades 26 serve to cut the small bundles which escape from the band cutter.

The arms 15 and 16 permit the spreader cylinder 17 to swing up over the cylinder cap 14 and out of operative position for the purpose of gaining easy access to the thresher 12 and to the band cutter 18 when necessary.

The bundles of straw, grain or the like enter the front of the machine and are engaged by the band cutter 18. The cutter 18 cuts the bundles loose and passes them in a loose condition to the spreader cylinder 17 when the straw is evenly distributed to the concave 11 by the outwardly feeding action of the strips 24. The threshing cylinder then acts upon the straw and passes it through the machine. If any of the bundles escape from the band cutter 18 without being loosened the blades 26 upon the cylinder 17 engage the same and cut the bands before it is spread and fed into the thresher 12.

What is claimed is:

A threshing machine having a spreader cylinder, said cylinder comprising a shaft, spaced heads on said shaft strips diagonally diverged across the peripheries of said heads, teeth on said strips, and blades on said strips, said teeth and said blades being alternately disposed in rows on said strips.

In testimony whereof I affix my signature, in presence of two witnesses.

MARTIN CARLSON.

Witnesses:
 LEWIS C. LARSON,
 MARY L. NELSON.